No. 868,851. PATENTED OCT. 22, 1907.
E. ERIXON.
MACHINE FOR PROPELLING PLOWS OR OTHER AGRICULTURAL IMPLEMENTS
APPLICATION FILED NOV. 19, 1906.
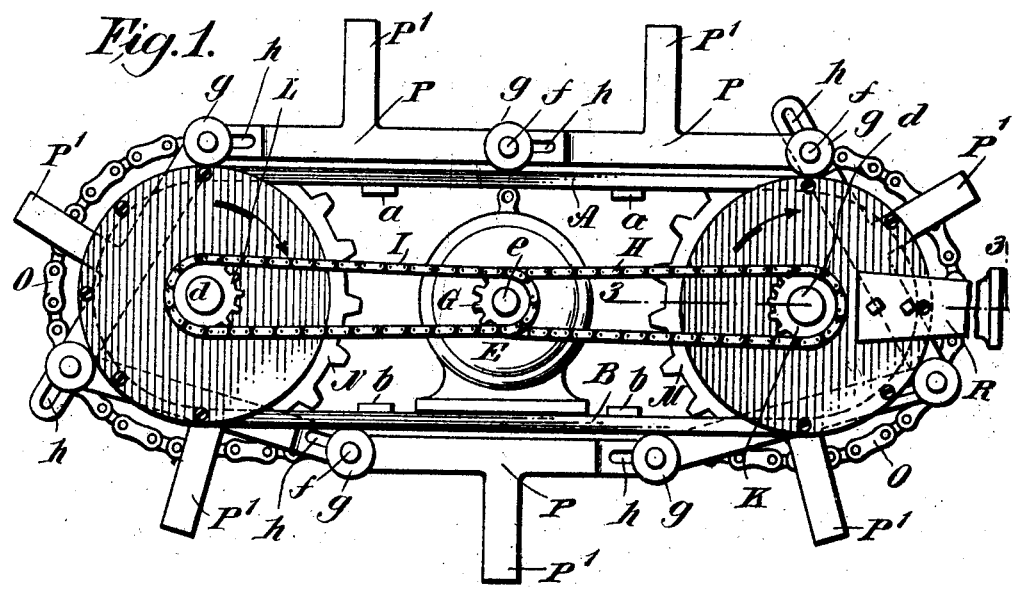
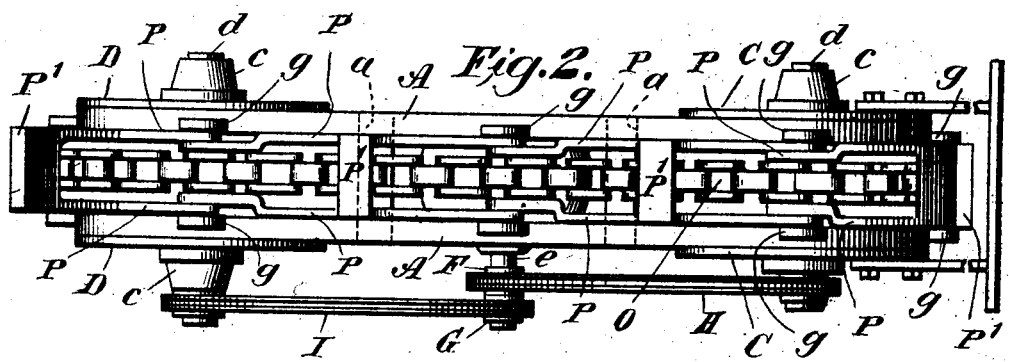
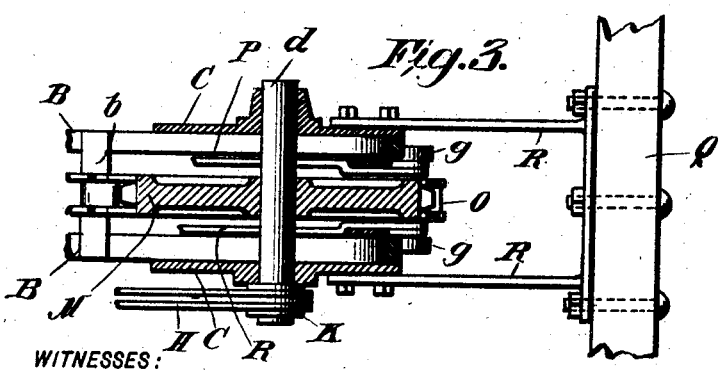
WITNESSES:
INVENTOR
Emil Erixon
BY
Ernst Lundgren
ATTORNEY

UNITED STATES PATENT OFFICE.

EMIL ERIXON, OF NEW YORK, N. Y.

MACHINE FOR PROPELLING PLOWS OR OTHER AGRICULTURAL IMPLEMENTS.

No. 868,851.      Specification of Letters Patent.      Patented Oct. 22, 1907.

Application filed November 19, 1906. Serial No. 344,168.

*To all whom it may concern:*

Be it known that I, EMIL ERIXON, a subject of the King of Sweden, residing at New York city, in the county and State of New York, have invented certain new and useful Improvements in Machines for Propelling Plows and other Agricultural Implements, of which the following, taken in connection with the accompanying drawings and the reference characters mounted thereon, is a full, clear, and exact specification.

My invention has relation to a machine more particularly designed for propelling plows and analogous soil-turning implements, but which may be advantageously employed for propelling any other agricultural implement, especially those wherein the propelling machine may be most conveniently applied so as to follow after the implement rather than to proceed before it.

The object of my invention is to provide or produce a simple, cheap, powerful, durable and easily operative machine which may be easily and quickly connected with a plow or series of plows or with any other agricultural or analogous implement or implements and which will serve to effectively propel the same and which may be reversed as occasion may require.

To accomplish all of the foregoing objects and to secure other and further advantages in the matters of construction, operation and use, my improvements involve certain new and useful arrangements or combinations of parts and peculiarities of construction as will be herein first fully described and then pointed out in the claims.

In the accompanying drawings forming part of this specification, Figure 1 is a side elevation and Fig. 2 a top or plan view showing my improved machine, the parts being assembled in position for use. Fig. 3 is a horizontal section and plan view on a plane through line 3—3 of Fig. 1, showing the construction of one end of the machine and the preferred means of coupling the machine to a beam or bar or other convenient portion of the implement which is to be propelled.

In all these figures like reference characters, wherever they occur, indicate corresponding parts.

The frame of the machine is made up of two principle side parts, the same being suitably connected and braced one with the other so as to remain quite rigid with respect to each other.

A, A, are the upper horizontal elements of the two side parts of the frame and B, B, are the corresponding lower horizontal elements of the same, the upper and lower elements on each side of the machine being suitably joined so as to form on each side a continuous track having substantially semi-circular end portions, substantially as shown. The joining may be by any preferred means but preferably each track is made as in one continuous piece, as shown. The upper horizontal elements are rigidly braced and united, one with respect to the other, by suitable cross pieces as $a$, $a$, properly secured in place, and the lower horizontal elements B, B, are similarly braced and secured by cross pieces as $b$, $b$. That the frame may be amply strong and durable it is made of metal of any convenient cross section and each side of the frame is made of sufficient width to afford the desired bearing or track on which the rollers to be hereafter described may move without danger of becoming displaced.

The curved end portion of the sides of the frame are supplied at front with circular plates, as C, C, firmly secured to the sides of the frame, and at the rear they are supplied with similar plates, represented at D, D. The plates C, C, and D, D, serve to stiffen the parts of the frame with which they are connected and they serve also to carry hubs, as $c$, $c$, within which the axles, $d$, $d$, are journaled.

E represents a motor of any preferred pattern, an explosive motor of ordinary form being conveniently applied in this position, although any other suitable form of motor may be adopted. The two lower elements of the frame, B, B, constitute a bed which receives the motor, the latter being suitably secured in place and being located between the lower and the upper horizontal elements of the frame. On the shaft $e$ of the motor are two driving chain-wheels or sprockets, F and G, one behind the other, and two drive chains, H and I, connect these chain drive-wheels respectively with a chain wheel, K, on the front axle of the machine and another chain wheel, L, on the rear axle, and through these chains and chain wheels power from the motor is conveyed simultaneously to both said axles, as will be readily seen. The drive wheels and the driven wheels may vary in relative diameter as may be preferred and for the usual purpose of varying the relative speed.

On each of the axles $d$, $d$, are keyed large sprocket wheels, as M, N, and these sprocket wheels serve to transmit motion to a continuous chain, represented at O, of the well known type of roller chain, with which the teeth of the sprocket wheels M, N, engage. At suitable intervals in this chain O are roller axles, $f$, $f$, carrying on their extremities small rollers, as $g$, $g$, which ride upon the exterior of the sides of the frame and upon the curved end portions, thus guiding the chain around the frame as the machine is moved in either direction.

Connected with the axles $f$ are the pieces P, each having a projecting part $P^1$ at about the central part, these projecting pieces operating as feet, which, by reason of the considerable weight of the machine are pressed into the ground or soil and therefore insure a firm hold by which the machine and the attached implement will be powerfully propelled without danger of failure or slipping. Each of the pieces P is slotted at one end, as at $h$, $h$, so as to enable each of the series of foot pieces to pass easily between the ends of the frame, one after the other, without cramping, while the chain follows more nearly the curve of the ends of the frame. Under the arrangement shown and with about the number of feet indicated, when one foot is leaving the ground another is just coming in contact with it, while between these two a third foot has always a firm bearing in the ground.

Q represents any part of the implement to be propelled. This may be a beam containing one or any number of plows, or it may be a bar of any other agricultural implement, as a mower or reaper, &c. The propelling machine is attached to this beam by a yoke represented at R, R, the same being bolted to the front of the machine and to the beam Q, substantially as indicated. Under this arrangement the machine and the implement to be propelled will be rigidly connected so that they must move together.

By applying the propelling machine so that the implement must precede it, the ground is not disturbed before being plowed, or the grain or other product is not disturbed by the machine until after the implement has been caused to perform its work.

The propelling machine being constructed and arranged substantially in accordance with the foregoing explanations will be found to admirably answer all the purposes or objects of the invention previously alluded to.

The propelling machine being comparatively narrow and having the feet arranged to be successively brought into contact with the ground, is easily directed in its course by the application of a hand bar, or by other suitable implement or means.

Having now fully described my invention, what I claim as new herein and desire to secure by Letters Patent, is:—

1. A machine of the character described comprising a frame, a motor, a chain operated by said motor and provided with rollers arranged to bear upon said frame, and a plurality of foot pieces carried by said chain, said foot pieces being connected to said chain in such manner as to permit independent movement of said pieces relative to the chain.

2. A machine of the character described comprising a frame, an endless chain mounted thereon, rollers mounted on suitable axles carried by said chain, a plurality of foot pieces secured to said axles in such manner as to permit independent movement of said foot pieces relative to said chain, and means for imparting movement to said chain.

3. In a machine for propelling plows, an endless chain, and a plurality of foot pieces secured to said chain and free to move independently of the latter.

4. In a machine of the character herein set forth, the combination with the frame and a continuous traveling chain, of rollers connected with said chain, and foot pieces connected with the axles of the rollers, said foot pieces being slotted at one end to avoid cramping, substantially as and for the purposes set forth.

5. In a machine for propelling plows and other agricultural implements, the combination of a motor, a frame, a continuous chain arranged to travel around said frame, a series of foot pieces connected with said chain and means for moving the same, side plates at the ends of the frame and a yoke, said yoke being arranged to be secured to the side plates and to the implement to be propelled, substantially as and for the purposes set forth.

In testimony whereof, I have signed my name to this specification in the presence of two subscribing witnesses.

EMIL ERIXON.

Witnesses:
C. SEDGWICK,
J. M. HOWARD.